United States Patent
Hosford et al.

[11] Patent Number: 5,966,450
[45] Date of Patent: *Oct. 12, 1999

[54] VARIABLE MASK FOR ENCRYPTION GENERATED INDEPENDENTLY AT COMMUNICATIONS STATIONS

[75] Inventors: Mark J. Hosford, San Diego, Calif.; James A. Reeds, III, New Providence, N.J.

[73] Assignee: Lucent Technologies, Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/696,300

[22] Filed: Aug. 13, 1996

[51] Int. Cl.$^6$ ...................................................... H04L 9/16
[52] U.S. Cl. .................................. 380/48; 380/6; 380/9; 380/46; 380/23; 455/410
[58] Field of Search ..................................... 380/6, 43, 46, 380/47, 48, 9; 364/717.05; 455/410, 411

[56] References Cited

U.S. PATENT DOCUMENTS

| | | | |
|---|---|---|---|
| 5,067,156 | 11/1991 | Martin | 380/46 |
| 5,081,679 | 1/1992 | Dent | 380/48 |
| 5,148,485 | 9/1992 | Dent | 380/46 |
| 5,258,936 | 11/1993 | Gallup et al. | 364/717.05 |
| 5,412,730 | 5/1995 | Jones | 380/46 |

OTHER PUBLICATIONS

Anderson, Ross, "Academic freedom under threat over the A5 algorithm.", Ross.Anderson@cl.cam.ac.uk, May 30, 1994, pp. 1–9.

Anderson, Ross, "A5—The GSM Encryption Algorithm", http://chem.leeds.ac.uk/ICAMS/people/jon/a5.html, Jun. 17, 1994.

Chambers, John M., "Computational Methods for Data Analysis", John Wiley & Sons, Inc., 1997, pp. 161–175.

Knuth, Donald E., "The Art of Computer Programming", 2nd Ed., Addison–Wesley Publishing Company, Inc., 1981, pp. 9–10.

Mouly, Michael and Pautet, Marie–Bernadette, "The GSM System for Mobile Communications", pub. M. Mouly et Marie–B. Pautet, Palaiseau, France, 1992, pp. 7,248–249, 478–493.

Telecommunications Industry Association (TIA), TIA/EIA/IS–130, Apr. 1995, 800 MHz Cellular Systems, TDMA Radio Interface, Radio Link Protocol 1, pp. i, ii, iii, 7, 43, and 44.

*Primary Examiner*—Pinchus M. Laufer
*Attorney, Agent, or Firm*—Morgan & Finneagn, LLP

[57] ABSTRACT

Frames of data are encrypted by combining each of the frames with a mask that varies from frame to frame. The mask is obtained by using a frame counter as the seed for a pseudo random number generator, generating n pseudo random numbers, where n is the number of bytes to be encrypted in each frame, and concatenating the most significant bytes of each of the n pseudo random numbers to form the mask. The encrypted frames are transmitted, received and decrypted by combining them with the mask, which is independently generated at the receiver. The frame counter is aperiodically reset to a new initial value that is a substantially random number with respect to a previous initial value.

22 Claims, 3 Drawing Sheets

```
unsigned char FVPM[65];          /* initialized by CAVE*/
unsigned char RVPM[65];          /* rolling mask */
unsigned long C;                 /* 24 bit counter */
#define hibyte(x) ( 0xff&((x)>>16))   /* high order byte of a 24 bit num. */
roll(){
    int i;
    unsigned long S;
    S = C;
    for(i=0; i<65; i++){
        S = 0xffffff & ( S*157);
        RVPM[i] = hibyte(S) ^ FVPM[i];
    }
}
```

FIG. 2

| iteration | seed | high order byte | FVPM | RVPM |
|---|---|---|---|---|
| 0 | 123456 | | | |
| 1 | 2a18be | 2a | c1 | eb |
| 2 | d12c86 | d1 | d3 | 02 |
| 3 | 484e2e | 48 | e1 | a9 |
| 4 | 57f236 | 57 | fd | aa |
| 5 | ef8b1e | ef | 39 | d6 |
| 6 | e85166 | e8 | a7 | 4f |
| 7 | 79eb8e | 79 | 59 | 20 |
| 8 | c57616 | c5 | 61 | a4 |
| 9 | 196b7e | 19 | d1 | c8 |
| 10 | 96ec46 | 96 | bb | 2d |

FIG. 3A

| iteration | seed | high order byte | FVPM | RVPM |
|---|---|---|---|---|
| 0 | 123457 | | | |
| 1 | 2a195b | 2a | c1 | eb |
| 2 | d18ccf | d1 | d3 | 02 |
| 3 | 835af3 | 83 | e1 | 62 |
| 4 | 8ec707 | 8e | fd | 73 |
| 5 | 900f4b | 90 | 39 | a9 |
| 6 | 5960ff | 59 | a7 | fe |
| 7 | d07c63 | d0 | 59 | 89 |
| 8 | dc48b7 | dc | 61 | bd |
| 9 | 18983b | 18 | d1 | c9 |
| 10 | 155c2f | 15 | bb | ae |

*FIG. 3B*

| iteration | seed | high order byte | FVPM | RVPM |
|---|---|---|---|---|
| 0 | 123458 | | | |
| 1 | 2a19f8 | 2a | c1 | eb |
| 2 | d1ed18 | d1 | d3 | 02 |
| 3 | be67b8 | be | e1 | 5f |
| 4 | c59bd8 | c5 | fd | 38 |
| 5 | 309378 | 30 | 39 | 09 |
| 6 | ca7098 | ca | a7 | 6d |
| 7 | 270d38 | 27 | 59 | 7e |
| 8 | f31b58 | f3 | 61 | 92 |
| 9 | 17c4f8 | 17 | d1 | c6 |
| 10 | 93cc18 | 93 | bb | 28 |

*FIG. 3C*

VARIABLE MASK FOR ENCRYPTION GENERATED INDEPENDENTLY AT COMMUNICATIONS STATIONS

FIELD OF THE INVENTION

The present invention is directed to a mask for encrypting frames of data transmitted between two entities, and more particularly, to a mask which is varied from frame to frame in dependence on the synchronization between the communicating entities.

BACKGROUND OF THE INVENTION

In North American wireless cellular telephony using a time divisional multiple access (TDMA) communication protocol, a voice signal in either traffic direction, that is, base station downstream to mobile station, or mobile station upstream to base station, is represented as a sequence of digitized speech frames. Each digitized speech frame is a block of a predetermined number of binary digits, representing the output of a speech-compressing analog-to-digital converter, together with various binary check digits and coding bits used for error detection and error correction.

To provide privacy in conversations, a transmitting station using a conventional encryption technique forms a fixed voice privacy mask (FVPM) having the same predetermined number of binary digits as the speech frame, and encrypts each frame with this particular FVPM, typically by simply combining the speech frame and the FVPM using an exclusive-or (XOR) operation, bit by bit. Decryption is performed at the receiving station by combining the received speech frame and the FVPM, again typically by XOR-ing the received frame and the FVPM. Since XOR-ing corresponds to inverting a bit, it will be appreciated that doubly inverting a binary digit recovers its initial value.

An advantage of this conventional technique is that the transmitting station and receiving station each have a procedure for privately generating the FVPM, so the FVPM is not transmitted and is not directly available to eavesdroppers. This technique is suitable for protecting against unintentional eavesdropping, such as incorrect channel tuning, or a simple channel scanning operation. Real-time decryption without knowledge of the FVPM is difficult using readily available computing systems.

A disadvantage of this conventional technique is that it does not provide sufficient security. More particularly, if an encrypted conversation is recorded, subsequent analysis can fairly easily determine the value of the FVPM and then perform unauthorized decryption of the conversation. Furthermore, it is believed to be only a matter of time until computing systems become readily available for real-time unauthorized decryption of conversations encrypted according to this conventional technique.

Thus, there is a need for an encryption technique wherein the transmitting station and receiving station each have a procedure for privately generating the encryption mask for transmitted frames, and which increases the difficulty of unauthorized decryption.

SUMMARY OF THE INVENTION

In accordance with an aspect of the present invention, frames of data are encrypted by obtaining a variable value which is aperiodically reset to a new initial value, the new initial value being a substantially random number with respect to a previous initial value. A variable mask differing at each respective frame and based on the variable value is generated. A frame of data and the variable mask are combined to produce an encrypted frame of data.

Using the variable value as a seed, a pseudo random number is generated and formed into the variable mask. Typically, the frame of data has a predetermined number n of bytes, n pseudo random numbers are generated, a byte is selected from each of the n pseudo random numbers, and the selected bytes form the variable mask.

The variable mask may be combined with the frame of data using an exclusive-OR operation.

The variable value may be a frame counter which is generally incremented upon receipt of a frame.

The variable value may be combined with a fixed value to produce the variable mask.

In accordance with another aspect of the present invention, frames of encrypted data, which have been encrypted by combining the unencrypted frames with a variable mask that differs at each respective frame, are decrypted by obtaining a variable value which is aperiodically reset to a new initial value that is a substantially random number with respect to a previous initial value, generating the variable mask based on the variable value, and combining a frame of encrypted data and the variable mask to produce a decrypted frame of data.

Using the variable value as a seed, a pseudo random number is generated and formed into the variable mask. Typically, the frame of data has a predetermined number n of bytes, n pseudo random numbers are generated, a byte is selected from each of the n pseudo random numbers, and the selected bytes form the variable mask.

It is not intended that the invention be summarized here in its entirety. Rather, further features, aspects and advantages of the invention are set forth in or are apparent from the following description and drawings.

BRIEF DESCRIPTION OF THE FIGURES

FIG. 2 shows representative C language software for obtaining the RVPM; and

FIGS. 3A–3C are tables showing respective examples of obtaining an RVPM.

DETAILED DESCRIPTION

Figure 1:
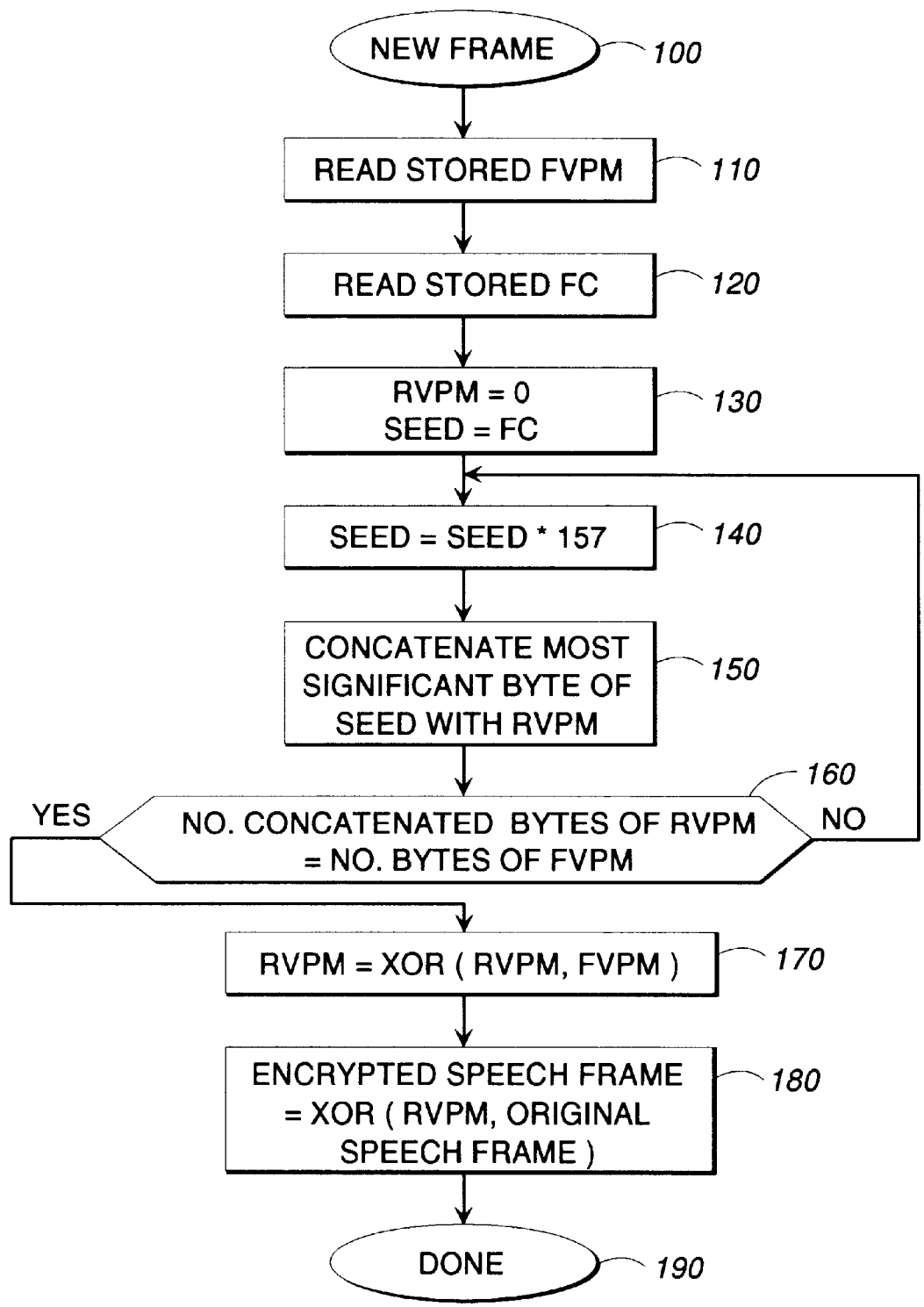
FIG. 1 is a flowchart illustrating use of the FVPM and frame counter to obtain the RVPM.

Provision of message encryption will be described assuming use of the IS 136 Revision A wireless communication protocol. The specification for the IS 136 Revision A protocol, approved for publication in February 1996, is available from the Telecommunications Industry Association, 2500 Wilson Boulevard, Arlington, Va. 22201.

Generation of a FVPM is specified in TR45.0.A, "Common Cryptographic Algorithms", Apr. 25, 1995, available from the Telecommunications Industry Association, referred to herein as the "CCA document". Specifically, the FVPM is generated from a cellular authentication voice privacy and encryption (CAVE) algorithm. Distribution of the CCA document is governed by International Traffic in Arms Regulations, 22 C.F.R. §§ 120–130. A general description of FVPM generation using a "jumble" algorithm rather than the specific CAVE algorithm is provided in, for example, U.S. Pat. No. 5,204,902 (Reeds, III et al.), the disclosure of which is hereby incorporated by reference.

According to the present encryption technique, the FVPM is combined with a variable value which differs at each frame to generate a variable voice privacy mask, which is then combined with the speech frame, such as by XOR-ing the variable voice privacy mask and the speech frame on a bit-by-bit basis, to produce an encrypted frame. When the value which differs at each frame varies in a generally monotonic manner, the variable voice privacy mask is referred to as a rolling voice privacy mask (RVPM).

The number of bytes in the variable voice privacy mask is the same as the number of bytes in the speech frame.

Decryption is performed by combining the received speech frame and the variable voice privacy mask, again typically by XOR-ing the received frame and the variable voice privacy mask, to recover the original speech frame.

A preferred technique for obtaining the variable value is described in U.S. patent application Ser. No. 08/696,452, filed on Aug. 13, 1996, the disclosure of which is hereby incorporated by reference. The variable value is the frame counter described in U.S. patent application Ser. No. 08/696, 452.

As explained in U.S. patent application Ser. No. 08/696, 452, a receiving station is one of a base station or a mobile station, and a transmitting station is the other of the base station or mobile station. Each of the receiving station and the transmitting station has a processor for performing the operations of the station, a memory for storing data and a wireless communications interface for transmitting and receiving data, coupled by a bus for transferring data therebetween.

Generally, a receiving station increments a frame counter each time a frame is received with a unique identifier, such as a color code, having an expected value, and then the receiving station sends a return frame having a color code with the expected value to its partner station which transmitted the received frame. If a frame is received with an unexpected color code value, the receiving station resets its frame counter and sends a color code having a designated value other than the expected value to force its partner station to reset its frame counter. The partner station then essentially notifies the receiving station that it has reset its frame counter, and both stations are in synchronization again.

The initial value of the frame counter is the most significant bits of the FVPM; this initial value is stored. From time to time, a station generates a new FVPM to obtain a new initial value for the frame counter and stores the new initial value of the frame counter. The new stored initial value of the frame counter is a substantially random number with respect to a previous stored initial value of the frame counter.

Resetting the frame counter comprises setting the frame counter to the stored initial value. Resetting may occur, for example, after an error is detected in a transmitted frame, or when a mobile station is handed off to a new base station.

It is an important aspect of the present encryption technique that the frame counter is obtained independently by each of the transmitting station and receiving station, so that the value of the frame counter is not transmitted and is thus more difficult to obtain for an eavesdropper.

It is also an important aspect of the present encryption technique that the transmitting station and receiving station are able to each generate their respective frame counters in synchronization with each other.

It is another important aspect of the present encryption technique that the transmitting station and receiving station can each reset their respective frame counters in synchronization. Further, the stored initial value of the frame counter can itself be changed from time to time in a synchronized manner by the transmitting station and receiving station without transmission of the actual initial value.

It is an important aspect of the present invention that the stored initial value is changed in a substantially random manner, that is, the sequence of stored initial values appears to be a sequence of random number. In fact, the sequence of stored initial values is a sequence of pseudo random numbers. This aspect increases the difficulty of unauthorized decryption.

Combination of the FVPM and the frame counter to produce an RVPM and encrypt the original speech frame will now be described with reference to FIG. 1. FIG. 2 shows representative C language software for obtaining the RVPM.

At step 100, a transmitting station is ready to encrypt an original speech frame. At step 110, the transmitting station obtains a value for the FVPM, typically by reading a stored value which has been generated as described in the CCA document during a registration procedure between the transmitting station and a receiving station.

At step 120, the transmitting station obtains a value for the frame counter (FC). Typically, the FC value for the present frame is the previous FC value incremented by one. However, from time to time the FC may be otherwise, such as when it is reset to a stored initial value. It will be recalled that the stored initial value may itself be changed from time to time, and that a new stored initial value is a substantially random number with respect to a previous stored initial value.

At step 130, the transmitting station clears the value of the RVPM, and sets a temporary variable SEED to the value of FC.

Step 140 is a pseudo random number iteration step of a multiplicative congruential pseudo random number generator (MC-PRNG). Important aspects of the MC-PRNG are that it is well understood, it is easy to implement since it is essentially a single multiply operation and it imposes a relatively small computational burden on the processor of the transmitting station. Other pseudo random number generation techniques may be used, such as a linear feedback shift register.

Specifically, at step 140, SEED is multiplied by a value "157" and then truncated to its original number of bits to generate a pseudo random number. Assuming that SEED is a 24 bit value, the multiplication at step 140 is 24 bit two's complement unsigned integer arithmetic. The value "157" is used because it gives good results, specifically, the sequence of values assumed by SEED appears to lack a pattern. Although a value other than "157"may be used, it is preferred that such value be odd, as even numbers will not result in a pseudo-random number sequence, and that such value fit in one byte (i.e., have a value less than $2^8$) to improve processing speed and reduce computational burden.

At step 150, the most significant byte of SEED is concatenated with the existing bytes of RVPM to generate an intermediate RVPM. At the first iteration, the most significant byte of SEED is used as the intermediate RVPM. Although other portions of SEED could be used as the intermediate RVPM, the most significant byte varies in a more random manner than any other byte, so it is preferred.

At step 160, it is determined whether the number of bytes in the intermediate RVPM matches the number of bytes n in each of the speech frame to be encrypted and the FVPM. If not, steps 140 and 150 are repeated. After the second iteration of steps 140 and 150, the intermediate RVPM has two bytes, namely, the most significant byte of (FC*157) concatenated with the most significant byte of (FC*157*157). After the nth iteration of steps 140 and 150, the intermediate RVPM has n bytes which are a concatenation of the most significant bytes of (FC*157$^1$), (FC*157$^2$) . . . (FC*157$^n$), respectively.

After the intermediate RVPM is determined to have a sufficient number of bytes at step 160, the transmitting station proceeds to step 170 and XORs the intermediate RVPM and the FVPM to produce the final RVPM. The final RVPM is a mask which differs at each respective frame to be encrypted.

At step 180, the transmitting station XORs the RVPM and the original speech frame to produce an encrypted speech frame. Then, the transmitting station continues with its processing to transmit the encrypted speech frame.

Algebraically equivalent but operationally different procedures exist for generating the n pseudo random numbers used to form the RVPM for a frame. For example, the n pseudo random numbers used to form the RVPM for a previous frame can be stored and combined with n precomputed difference numbers to generate the n pseudo random numbers used to form the RVPM for a next frame by performing n additions instead of the n multiplications as described above, in the case where the frame counter is incremented by one, because:

$$(FC+1)* 157^n = FC * 157^n + 157^n$$

An example of obtaining an RVPM will now be discussed.

Let the bytes, in hexadecimal, of the FVPM be:

(c1 d3 e1 fd 39 a7 59 61 d1 bb)

Let the bytes, in hexadecimal, of the frame counter be:

(12 34 56)

The multiplier is "157" (decimal) or "9d" (hexadecimal).

The first iteration comprises multiplying the frame counter by the multiplier (123456* 9d=b2a18be), using the low order three bytes as the next seed (2a18be), and using the high order byte of this seed as the first byte of the intermediate RVPM (2a).

The second iteration comprises multiplying the value of the seed obtained at the previous iteration by the multiplier (2a18be* 9d=19d12c86), using the low order three bytes as the next seed (d12c86), and using the high order byte of this seed as the next byte of the intermediate RVPM (d1). After the second iteration, the intermediate RVPM is (2a d1).

The third iteration comprises multiplying the value of the seed obtained at the previous iteration by the multiplier (d12c86* 9d=80484e2e), using the low order three bytes as the next seed (484e2e), and using the high order byte of this seed as the next byte of the intermediate RVPM (48). After the third iteration, the intermediate RVPM is (2a d1 48).

There are ten bytes in each of the speech frame to be encrypted and the FVPM, so this procedure is repeated ten times to obtain an intermediate RVPM of:

(2a d1 48 57 ef e8 79 c5 19 96).

The FVPM and intermediate RVPM are XOR-ed:

(c1 d3 e1 fd 39 a7 59 61 d1 bb)
   XOR
(2a d1 48 57 ef e8 79 c5 19 96).
to obtain a final RVPM:

(eb 02 a9 aa d6 4f 20 a4 c8 2d).

FIGS. 3A–3C show three examples of obtaining an RVPM. The frame counter, that is, the initial value of SEED, of FIG. 3A is incremented by one to obtain the FC of FIG. 3B, which in turn is incremented by one to obtain the FC of FIG. 3C. It will be recalled that, from time to time, the frame counter is reset to its stored initial value and that the stored initial values are a sequence of substantially random numbers. The FVPM is the same in each of FIGS. 3A–3C. The RVPM differs in each of FIGS. 3A–3C, as follows:

(eb 02 a9 aa d6 4f 20 a4 c8 2d)

(eb 02 62 73 a9 fe 89 bd c9 ae)

(eb 02 5f 38 09 6d 7e 92 c6 28)

Therefore, it is more difficult to perform unauthorized decryption of consecutive frames incremented with the RVPMs shown in FIGS. 3A–3C as compared to consecutive frames incremented with the FVPM of FIGS. 3A–3C.

In another embodiment, the present technique is used to generate a rolling signalling message encryption (SME) mask. For a subscriber who has the SME service active, SME is applied when the subscriber presses SEND on his or her cellular telephone during a conversation. SME is used, for example, to encrypt the telephone number of a third party added to form a three way call, and to encrypt frames of the three way conversation. Application of the present technique increases the difficulty of unauthorized decryption of SME.

Although the embodiments described above have been in the context of a wireless communication system, it will be appreciated that a wireline communication system is also an appropriate environment for the present synchronized secure transmission technique.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of encrypting frames of data for transmission between a transmitting station and a receiving station, comprising the steps of:

obtaining a variable value which is reset to a new initial value, resetting being other than incrementing and occurring upon error detection at a time other than during handoff, the new initial value being a substantially random number with respect to a previous initial value, the variable value not being transmitted between the transmitting and receiving stations;

generating a variable mask which differs at each respective frame based on the variable value; and combining a frame of data and the variable mask to produce an encrypted frame.

2. The method of claim 1, wherein the step of combining includes performing an exclusive-OR operation on the frame of data and the variable mask.

3. The method of claim 1, wherein the variable value for a previous frame is incremented to produce the variable value for a next frame.

4. The method of claim 3, wherein the variable value is a frame counter of received frames of data.

5. The method of claim 1, further comprising the steps of generating a pseudo random number as a function of the variable value, and forming the pseudo random number into the variable mask.

6. The method of claim 5, wherein the step of generating uses the variable value as a seed.

7. The method of claim 5, wherein the frame of data has a predetermined number n of bytes, the step of generating a pseudo random number is performed n times, and further comprising the step of selecting a byte from each of the n pseudo random numbers, and wherein the step of forming uses the selected bytes to form the variable mask.

8. The method of claim 7, wherein the step of selecting selects the most significant byte from each of the n pseudo random numbers.

9. The method of claim 7, wherein the step of forming consists of concatenating the selected bytes to form the variable mask.

10. The method of claim 1, further comprising the steps of obtaining a fixed value, and combining the fixed value with the variable value to produce the variable mask.

11. The method of claim 1, wherein the step of generating a variable mask uses an iterative process.

12. A method of decrypting frames of data which have been transmitted between a transmitting station and a receiving station, and which have been encrypted by combining the unencrypted frames with a variable mask that differs at each respective frame, comprising the steps of:

obtaining a variable value which is reset to a new initial value, resetting being other than incrementing and occurring upon error detection at a time other than during handoff, the new initial value being a substantially random number with respect to a previous initial value, the variable value not being transmitted between the transmitting and receiving stations;

generating the variable mask based on the variable value; and combining a frame of encrypted data and the variable mask to produce a decrypted frame of data.

13. The method of claim 12, further comprising the steps of generating a pseudo random number as a function of the variable value, and forming the pseudo random number into the variable mask.

14. The method of claim 13, wherein the step of generating uses the variable value as a seed.

15. The method of claim 13, wherein the frame of data has a predetermined number n of bytes, the step of generating a pseudo random number is performed n times, and further comprising the step of selecting a byte from each of the n pseudo random numbers, and wherein the step of forming uses the selected bytes to form the variable mask.

16. The method of claim 15, wherein the step of selecting selects the most significant byte from each of the n pseudo random numbers.

17. The method of claim 15, wherein the step of forming consists of concatenating the selected bytes to form the variable mask.

18. The method of claim 12, wherein the step of generating the variable mask uses an iterative process.

19. A method of encrypting frames of data for transmission between a transmitting station and a receiving station, comprising the steps of:

obtaining a variable value which is aperiodically reset to a new initial value, the new initial value being a substantially random number with respect to a previous initial value, the variable value not being transmitted between the transmitting and receiving stations, resetting being other than incrementing;

incrementing the variable value from frame-to-frame when the variable value has not been reset in a particular frame;

generating a variable mask which differs at each respective frame based on the variable value; and combining a frame of data and the variable mask to produce an encrypted frame.

20. The method of claim 19, wherein the step of generating a variable mask uses an iterative process.

21. A method of decrypting frames of data which have been transmitted between a transmitting station and a receiving station, and which have been encrypted by combining the unencrypted frames with a variable mask that differs at each respective frame, comprising the steps of:

obtaining a variable value which is aperiodically reset to a new initial value, the new initial value being a substantially random number with respect to a previous initial value, the variable value not being transmitted between the transmitting and receiving stations, resetting being other than incrementing;

incrementing the variable value from frame-to-frame when the variable value has not been reset in a particular frame;

generating the variable mask based on the variable value; and combining a frame of encrypted data and the variable mask to produce a decrypted frame of data.

22. The method of claim 21, wherein the step of generating the variable mask uses an iterative process.

* * * * *